US012781623B2

(12) United States Patent
Li et al.

(10) Patent No.: US 12,781,623 B2
(45) Date of Patent: Nov. 3, 2026

(54) METHOD AND SYSTEM FOR GENERATING FORMATION PROPERTY VOLUME USING MACHINE LEARNING

(71) Applicant: ARAMCO SERVICES COMPANY, Houston, TX (US)

(72) Inventors: Weichang Li, Katy, TX (US); Murtadha J. AlTammar, Dhahran (SA); Khalid M. Alruwaili, Dammam (SA); Osman Hamid, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1205 days.

(21) Appl. No.: 17/644,845

(22) Filed: Dec. 17, 2021

(65) Prior Publication Data

US 2023/0193751 A1 Jun. 22, 2023

(51) Int. Cl.

| | |
|---|---|
| ***E21B 49/00*** | (2006.01) |
| ***E21B 47/10*** | (2012.01) |
| ***G06N 3/08*** | (2023.01) |

(52) U.S. Cl.

CPC .............. *E21B 49/00* (2013.01); *E21B 47/10* (2013.01); *G06N 3/08* (2013.01); *E21B 2200/20* (2020.05); *E21B 2200/22* (2020.05)

(58) Field of Classification Search

CPC ...... E21B 49/00; E21B 47/10; E21B 2200/20; E21B 2200/22; E21B 2200/6169;

(Continued)

(56) References Cited

U.S. PATENT DOCUMENTS

| | | | |
|---|---|---|---|
| 6,654,692 | B1 | 11/2003 | Neff |
| 7,821,260 | B2 | 10/2010 | Hamdan et al. |

(Continued)

FOREIGN PATENT DOCUMENTS

| | | |
|---|---|---|
| CN | 111025396 A | 4/2020 |
| CN | 111665560 A | 9/2020 |

(Continued)

OTHER PUBLICATIONS

Al-Ali, Ali, and et al. "Applications of artificial neural network for seismic facies classification: A case study from the mid-Cretaceous reservoir in supergiant oil field." In SPE Europec featured at EAGE Conference and Exhibition?, p. D031S024R001. SPE, 2020 (Year: 2020).*

(Continued)

*Primary Examiner* — Douglas Kay
(74) *Attorney, Agent, or Firm* — Osha Bergman Watanabe & Burton LLP

(57) ABSTRACT

A method may include obtaining well log data for various wells regarding a geological region of interest. The well log data may correspond to various well logs with different logging types. The method may include assigning, using a grouping algorithm, subsets of the well log data to various groups based on one or more geological attributes. The method may include determining, using the groups and a machine-learning algorithm, various well zones for different portions of a respective well among the wells. The method may include determining interpolated log data using the well log data, the well zones, and an intrawell interpolation process. The method may include generating a formation property volume based on the interpolated log data and the well log data.

13 Claims, 11 Drawing Sheets

(58) Field of Classification Search
CPC ............. G06N 3/08; G01V 2210/6169; G01V 2210/62; G01V 2210/624; G01V 1/50
See application file for complete search history.

(56) References Cited

U.S. PATENT DOCUMENTS

| | | | | |
|---|---|---|---|---|
| 8,838,428 | B2 | 9/2014 | Tapscott et al. | |
| 9,892,366 | B2 * | 2/2018 | Gevirtz | E21B 49/00 |
| 10,510,167 | B2 | 12/2019 | Vennelakanti et al. | |
| 11,694,095 | B2 * | 7/2023 | Akkurt | G01V 5/10 706/12 |
| 12,429,624 | B2 * | 9/2025 | Gkortsas | G01V 11/00 |
| 2015/0088424 | A1 | 3/2015 | Burlakov et al. | |
| 2015/0356403 | A1 | 12/2015 | Storm, Jr. | |
| 2016/0170065 | A1 | 6/2016 | Jain et al. | |
| 2016/0364654 | A1 * | 12/2016 | Gevirtz | G01V 20/00 |
| 2017/0177764 | A1 * | 6/2017 | Guy | G01V 1/282 |
| 2018/0347354 | A1 * | 12/2018 | Li | G06N 20/00 |
| 2019/0169986 | A1 | 6/2019 | Storm, Jr. et al. | |
| 2019/0293818 | A1 | 9/2019 | Meek | |
| 2019/0368316 | A1 | 12/2019 | Bize-Forest et al. | |
| 2020/0088897 | A1 | 3/2020 | Roy et al. | |
| 2020/0150305 | A1 * | 5/2020 | Guevara Diaz | G01V 1/22 |
| 2020/0319360 | A1 * | 10/2020 | Horne | G01V 1/284 |
| 2020/0334577 | A1 * | 10/2020 | Anderson | G06Q 10/063 |
| 2021/0041596 | A1 | 2/2021 | Kushwaha et al. | |
| 2021/0110280 | A1 * | 4/2021 | Akkurt | G01V 1/306 |
| 2021/0293133 | A1 | 9/2021 | Panchal et al. | |
| 2021/0326721 | A1 | 10/2021 | Zhang et al. | |
| 2021/0340861 | A1 * | 11/2021 | Al Ismail | G01V 11/00 |
| 2022/0146705 | A1 * | 5/2022 | Gkortsas | E21B 49/00 |
| 2022/0237891 | A1 * | 7/2022 | Xu | E21B 47/002 |
| 2023/0003118 | A1 * | 1/2023 | AlTammar | E21B 44/00 |

FOREIGN PATENT DOCUMENTS

| | | | |
|---|---|---|---|
| WO | 20160187242 | A1 | 11/2016 |
| WO | 2019236955 | A1 | 12/2019 |
| WO | 2020131082 | A1 | 6/2020 |
| WO | 2020185094 | A1 | 9/2020 |
| WO | 2020185840 | A1 | 9/2020 |
| WO | 2020197769 | A1 | 10/2020 |

OTHER PUBLICATIONS

Bukar, Idris, and et al. "A machine learning approach to shear sonic log prediction." In SPE Nigeria Annual International Conference and Exhibition, p. D023S026R001. SPE, 2019 (Year: 2019).*

Onalo, David, and et al. "Data driven model for sonic well log prediction." Journal of Petroleum Science and Engineering 170 (2018) : 1022-1037 (Year: 2018).*

Zhang, Donogxiao, et al., "Synthetic well logs generation via Recurrent Neural Networks", Petroleum Exploration and Development, vol. 45, Issue 4, pp. 629-639, Apr. 2018 (11 pages).

Raissi, M., et al., "Physics-informed neural networks: A deep learning framework for solving forward and inverse problems involving nonlinear partial differential equations", Journal of Computational Physics, pp. 686-707, 2019 (22 pages).

Zhu, Yinhao, et al., "Physics-constrained deep learning for high-dimensional surrogate modeling and uncertainty qualification without labeled data", Journal of Computerized Physics, pp. 56-81, 2019 (26 pages).

Chen, Yuntian, et al., "Physics-Constrained Deep Learning of Geomechanical Logs", IEEE Transactions on Geoscience and Remote Sensing, vol. 58, No. 8, pp. 5932-5943, Aug. 2020 (12 pages).

Pham, Nam, et al., "Missing well log prediction using convolutional long short-term memory network", Geophysics, vol. 85, No. 4, pp. WA159-WA171, Aug. 2020 (13 pages).

Onalo, David, et al., "Dynamic data driven sonic well log model for formation evaluation", Journal of Petroleum Science and Engineering, pp. 1049-1062, 2019 (14 pages).

Barton, Colleen A., et al., "In-Situ Stress Orientation and Magnitude At The Fenton Geothermal Site, New Mexico, Determined From Wellbore Breakouts", Geophysical Research Letters, vol. 15, No. 5, pp. 467-470, May 1988 (5 pages).

Bader et al.; "Missing log data interpolation and semiautomatic seismic well ties using data matching techniques", Interpretation; vol. 7; Issue 2; May 2019; pp. T347-T361 (15 pages).

Chen, Y. and Zhang, D.; "Physics-Constrained Deep Learning of Geomechanical Logs", IEEE Transactions on Geoscience and Remote Sensing; vol. 58; No. 8; pp. 5932-5943 (12 pages).

Justin Gosses; "Stratigraphic top prediction in well logs via machine-learning: Predictatops;" Aug. 11, 2019; pp. 1-14; Retrieved from the Internet: URL: https://justingosses.medium.com/https-medium-com-justingosses-stratigraphic-pick-prediction-via-supervised-machine-learning-predictatops-841cb5fc3efb (14 pages).

Dave Hale, "Image-guided 3D interpolation of borehola data", SEG Technical Program Expanded Abstracts 2010; Oct. 21, 2010; pp. 1-13 (13 pages).

Hengl et al.; "Random Forest as a generic framework for predictive modeling of spatial and spatio-temporal variables", PeerJ Preprints; vol. 3; May 27, 2018; pp. 1-47 (47 pages).

Kim et al.; "Generation of Synthetic Density Log Data Using Deep Learning Algorithm at the Golden Field in Alberta, Canada", Geofluids; vol. 2020; Jan. 30, 2020; pp. 1-26 (26 pages).

Shi et al.; "Well log interpolation guided by geologic distance;" SEG Technical Program Expanded Abstracts 2017; Aug. 2017; pp. 1939-1943 (5 pages).

Yingwei Yu, "Interpolating High-Resolution Well Log Volume Using Seismic Dip Vectors and Control Grids", Unconventional Resources Technology Conference; URTEC-2016-2435701-MS; Aug. 1, 2016; pp. 1-11 (11 pages).

Office Action issued in corresponding Saudi Arabian Application No. 122440881; dated Apr. 22, 2025 (20 pages).

* cited by examiner

METHOD AND SYSTEM FOR GENERATING FORMATION PROPERTY VOLUME USING MACHINE LEARNING

BACKGROUND

A subsurface formation may be determined using various measurements obtained through logging tools. For example, these measurements may be used to calculate porosity, permeability, and other properties of a reservoir formation. However, in many situations, logging tool measurements may be unavailable at various wells for specific log types or interwell locations outside the vicinity of the drilled wells.

SUMMARY

This summary is provided to introduce a selection of further described concepts in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, well log data for various wells regarding a geological region of interest. The well log data corresponds to various well logs with different logging types. The method further includes assigning, by the computer processor and using a grouping algorithm, subsets of the well log data to various groups based on one or more geological attributes. The method further includes determining, by the computer processor and using the groups and a machine-learning algorithm, various well zones for different portions of a respective well among the wells. The method further includes determining, by the computer processor, interpolated log data using the well log data, the well zones, and an intrawell interpolation process. The method further includes generating, by the computer processor, a formation property volume based on the interpolated log data and the well log data.

In general, in one aspect, embodiments relate to a method that includes obtaining, by a computer processor, well log data for various wells regarding a geological region of interest. The well log data corresponds to various well logs with different logging types. The method further includes assigning, by the computer processor and using a grouping algorithm, subsets of the well log data to various groups based on one or more geological attributes. The method further includes determining, by the computer processor and using the groups and a machine-learning algorithm, various well zones for different portions of a respective well among the wells. The method further includes determining, by the computer processor, extrapolated log data using the well log data, the well zones, and an interwell interpolation process. The method further includes generating, by the computer processor, a formation property volume based on the interpolated log data and the well log data.

In general, in one aspect, embodiments relate to a system that includes a logging system coupled to a logging tool. The system further includes a well system coupled to the logging system and a wellbore. The system further includes a reservoir simulator that includes a computer processor. The reservoir simulator is coupled to the logging system and the well system. The reservoir simulator obtains, using the logging tool, first well log data that is a portion of a second well log data for various wells regarding a geological region of interest. The second well log data corresponds to various well logs with different logging types. The reservoir simulator assigns, using a grouping algorithm, subsets of the second well log data to various groups based on one or more geological attributes. The reservoir simulator determines, using the groups and a machine-learning algorithm, various well zones for different portions of a respective well among the wells. The reservoir simulator determines interpolated log data using the well log data, the well zones, and an intrawell interpolation process. The reservoir simulator generates a formation property volume based on the interpolated log data and the second well log data.

In general, in one aspect, embodiments relate to a non-transitory computer readable medium storing instructions executable by a computer processor. The instructions obtain well log data for various wells regarding a geological region of interest. The well log data corresponds to various well logs with different logging types. The instructions assign, using a grouping algorithm, subsets of the well log data to various groups based on one or more geological attributes. The instructions determine, using the groups and a machine-learning algorithm, various well zones for different portions of a respective well among the wells. The instructions determine interpolated log data using the well log data, the well zones, and an intrawell interpolation process. The instructions generate a formation property volume based on the interpolated log data and the well log data.

The claimed subject matter's other aspects and advantages will be apparent from the following description and the appended claims.

BRIEF DESCRIPTION OF DRAWINGS

Specific embodiments of the disclosed technology will now be described in detail regarding the accompanying figures. Like elements in the various figures are denoted by like reference numerals for consistency.

DETAILED DESCRIPTION

Figure 1:
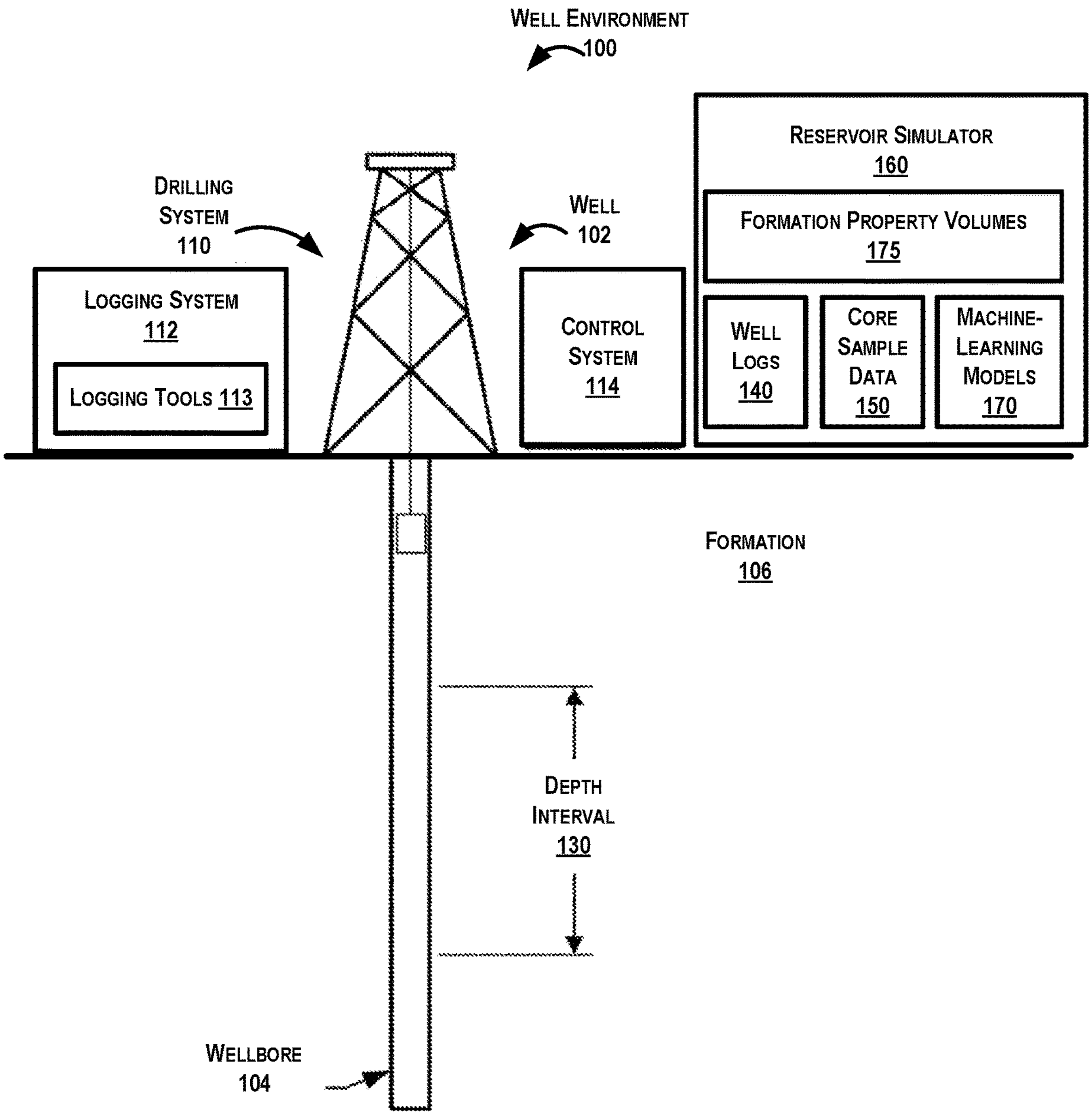
FIG. 1 shows a system following one or more embodiments.

In the following detailed description of embodiments of the disclosure, numerous specific details are outlined to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Instead, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for generating and using a formation property volume based on acquired well log data, predicted log data, interpolated log data, and/or extrapolated log data. A hierarchical multi-stage machine-learning framework is used to obtain formation property values in a 2D or 3D geological region in some embodiments. For example, well logs may be obtained from many wells in single or multiple fields. After this well log consolidation, samples of well logs may be grouped into subsets of well log data according to various geological attributes and grouping algorithms (e.g., the grouping may be performed based on geological time periods using a clustering algorithm). After grouping, well zones may be determined that identify depth boundaries for well log data with common geological attributes, such as facies types, stratigraphic horizons, and geological time periods. Likewise, the group results and the well zones may be used in a training regime for one or more machine learning models. Thus, machine-learning models and machine-learning algorithms may be used in the following situations: (1) predictions for a different type of well log data from available well log data; (2) predictions for missing well log data for a well within an intrawell interpolation process; and (3) predictions for missing well log data in interwell regions between different wells using an interwell extrapolation process.

Furthermore, "intrawell interpolation" and "interwell extrapolation" may refer to multiple types of well log analyses and machine-learning techniques. In particular, both terms may include interpolation, extrapolation, and/or intrapolation of data. For illustration, where well log data is predicted in a three-dimensional volume, there may not be a clear distinction between a process that qualifies as an interpolation or an extrapolation. Accordingly, "intrawell interpolation" is intended to refer to any data prediction process that determines well log data within or proximate a single well (e.g., by predicting a missing type of well log data from available log data or predicting well log data beyond the furthest extent of a logging tool's depth range). Likewise, "interwell extrapolation" is intended to refer to any data prediction process that determines well log data between two or more wells.

Moreover, "interpolated log data" may refer to an output of an intrawell interpolation process, while "extrapolated log data" may refer to a result of an interwell extrapolation process.

FIG. 1 shows a schematic diagram in accordance with one or more embodiments. As shown, FIG. 1 illustrates a well environment (100) that may include a well (102) having a wellbore (104) extending into a formation (106). The wellbore (104) may consist of a bored hole that extends from the surface into a target zone of the formation (106), such as a reservoir. The formation (106) may include various formation characteristics of interest, such as formation porosity, formation permeability, resistivity, density, water saturation, and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may indicate the porosity of the formation (106) and the presence of hydrocarbons. More specifically, resistivity may be relatively low for a formation with high porosity and a large amount of water, and resistivity may be relatively high for a formation that has low porosity or includes a large number of hydrocarbons. Water saturation may indicate the fraction of water in given pore space.

Keeping with FIG. 1, the well environment (100) may include a reservoir simulator (160) and various well systems, such as a drilling system (110), a logging system (112), a control system (114), and a well completion system (not shown). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a data acquisition and monitoring system that is used to acquire equipment data and to monitor one or more well operations, or a well interpretation software system that is used to analyze and understand well events, such as drilling progress. A logging system may be similar to a control system with a specific focus on managing one or more logging tools.

Turning to the reservoir simulator (160), a reservoir simulator (160) may include hardware and/or software with functionality for storing and analyzing well logs (140), core sample data (150), seismic data, and/or other types of data to generate and/or update one or more formation property volumes (175). A formation property volume may describe well log data at one or more wells throughout a geological region of interest, such as gamma-ray data for an entire rock volume or reservoir volume. For example, a formation property volume may describe well log data in two-dimensions or three-dimensions. Thus, the formation property volume may include interpolated data from an intrawell interpolation process and/or extrapolated data from an interwell extrapolation process. For more information on intrawell interpolation processes and/or interwell extrapolation processes, see Blocks 240 and 250 in FIG. 2 and the accompanying description below.

While the reservoir simulator (160) is shown at a well site, the reservoir simulator (160) may be remote from a well site in some embodiments. In some embodiments, the reservoir simulator (160) is implemented as part of a software platform for the control system (114). The software platform may obtain data acquired by the drilling system (110) and logging system (112) as inputs, including multiple data types from various sources. The software platform may aggregate the data from these systems (110, 112) in real-time for rapid analysis. In some embodiments, the control system (114), the logging system (112), the reservoir simulator (160), and/or a user device coupled to one of these systems may include a computer system that is similar to the computer system (902) described below with regard to FIG. 9 and the accompanying description.

The logging system (112) may include one or more logging tools (113) for use in generating well logs of the formation (106). For example, a logging tool may be lowered into the wellbore (104) to acquire measurements as the tool traverses a depth interval (130) (e.g., a targeted reservoir section) of the wellbore (104). The plot of the logging measurements versus depth may be referred to as a "log" or "well log". Well logs (140) may provide depth measurements of the well (104) that describe such reservoir characteristics as formation porosity, formation permeability, resistivity, water saturation, and the like. The resulting logging measurements may be stored and/or processed, for example, by the control system (114), to generate corresponding well logs for the well (102). A well log (140) may include, for example, a plot of a logging response time versus true vertical depth (TVD) across the depth interval (130) of the wellbore (104).

Turning to examples of logging techniques, multiple types of logging techniques are available for determining various reservoir characteristics. Gamma-ray logging is used to measure naturally occurring gamma radiation to characterize rock or sediment regions within a wellbore in some embodiments. In particular, different types of rock may emit different amounts and different spectra of natural gamma radiation. For example, gamma-ray logs may distinguish between shales and sandstones/carbonate rocks because radioactive potassium may be common in shales. Likewise, the cation exchange capacity of clay within shales may also result in higher absorption of uranium and thorium, further increasing the amount of gamma radiation produced by shales.

Turning to nuclear magnetic resonance (NMR) logging, an NMR logging tool may measure the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability and the types of fluids present in the pore spaces. Thus, NMR logging may be a subcategory of electromagnetic logging that responds to the presence of hydrogen protons rather than a rock matrix. Because hydrogen protons may occur primarily in pore fluids, NMR logging may directly or indirectly measure the volume, composition, viscosity, and distribution of pore fluids.

Keeping with NMR logging, NMR logging techniques may determine multiple signals for analyzing a geological region. First, NMR logging may determine spin-lattice relaxation values or a T1 signal amplitude measured from the buildup of magnetization along a static applied magnetic field. For example, T1 signal values may be mainly related to pore size and viscosity. NMR logging may also determine transverse relaxation values or a T2 signal amplitude that describes the decay of an excited magnetization perpendicular to an applied magnetic field. More specifically, a T2 signal may refer to the decaying time for hydrogen protons to complete dephasing. Likewise, NMR logging measurements may be illustrated as a T2 signal amplitude versus time and determine a distribution of porosity components (i.e., a T2 distribution) as a function of their T2 times. Thus, a T2 signal amplitude may be proportional to hydrogen content within a geological region and therefore may determine porosity independent of the rock matrix. Both relaxation times may provide information for determining pore-size information and pore-fluid properties, especially viscosity.

Turning to spontaneous potential (SP) logging, SP logging may determine the permeabilities of rocks in the formation (106) by measuring the amount of electrical current generated between drilling fluid produced by the drilling system (110) and formation water that is held in pore spaces of the reservoir rock. Porous sandstones with high permeabilities may generate more electricity than impermeable shales. Thus, SP logs may be used to identify sandstones from shales.

Another type of electrical logging technique is resistivity logging. Resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

Another electrical logging technique is dielectric logging. For example, dielectric permittivity may be defined as a physical quantity that describes the propagation of an electromagnetic field through a dielectric medium. As such, dielectric permittivity may describe a physical medium's ability to polarize in response to an electromagnetic field and thus reduce the total electric field inside the physical medium. In a portion of reservoir rock, water may have a large dielectric permittivity higher than any associated rock or hydrocarbon fluids within the portion. In particular, water permittivity may depend on a frequency of an electromagnetic wave, water pressure, water temperature, and salinity of the reservoir rock mixture. Likewise, a multi-frequency dielectric logging tool may determine the value of the water-filled porosity in the reservoir rock.

Keeping with dielectric logging, a dielectric logging tool may determine a dielectric constant (i.e., relative-permittivity) measurement. For example, the dielectric logging tool may include an antenna that detects relative dielectric constants between different fluids at a fluid interface. As such, a dielectric logging tool may generate a dielectric log of the high-frequency dielectric properties of a formation. In particular, a dielectric log may include two curves, where one curve may describe the relative dielectric permittivity of the analyzed rock. The other curve may describe the resistivity of the analyzed rock. Relative dielectric permittivity may be used to distinguish hydrocarbons from the water of differing salinities. However, the effect of salinity may be more important than the salinity effect with a high-frequency dielectric log (also called an "electromagnetic propagation log").

Furthermore, dielectric logging tools may include low-frequency tools and high-frequency tools. A low-frequency dielectric logging tool may use coils on a mandrel and operate at tens of megahertz. For a high-frequency dielectric logging tool called an electromagnetic propagation tool (EPT), the dielectric logging tool may use a microwave antennae on a pad contact device. For example, the high-frequency dielectric logging tool may measure the propagation time and attenuation of an electromagnetic wave as the electromagnetic wave passes through a specific interval of formation. As such, electromagnetic waves may be sent sequentially by two transmitters in the dielectric logging tool, where receivers may measure the amplitude and phase shift of the transmitted electromagnetic waves.

Turning to caliper logging, one or more logging tools (113) may include a caliper logging tool. For example, a caliper logging tool may include hardware to determine a diameter of a borehole along with its depth. In particular, a caliper logging tool may measure variation in borehole diameters as the logging tool is withdrawn from the bottom of a borehole, using two or more articulated arms that push against the borehole wall. An articulated arm may be connected to a potentiometer that causes resistance to change as the diameter of the borehole changes, resulting in varying electrical signals that correspond to changes to diameter. After calibration, the caliper logging tool may generate a caliper log printed as a continuous series of hole diameter values or radius values with respect to depth.

Moreover, some caliper logging tools may use electromagnetic techniques or acoustic techniques to determine diameter sizes. For electromagnetic sensing techniques, a caliper logging tool may include a coil centered inside a tubular that generates an alternating magnetic field and another coil farther up the logging tool that measures phase shift introduced by the tubular. A caliper logging tool may include a transducer that detects a high-frequency pulse reflected from a tubular or a borehole wall back to the transducer for acoustic sensing techniques. As such, a diameter measurement may be determined from the time of flight of this reflected wave and a fluid's acoustic velocity. In some embodiments, a caliper logging tool is a multi-finger caliper. For an irregularly shaped wellbore, a multi-finger caliper may simultaneously determine diameters at several different locations. Within casing pipe and using a large number of arms (also called "fingers"), the caliper logging tool may detect small changes in the wall of the pipe. For illustration purposes, a multi-finger caliper may have between 20 and 80 fingers (compared to caliper logging tools with 2 or 4 fingers), where such larger numbers of fingers may be used in larger pipes. Thus, a caliper logging tool may detect deformations, scale buildup, and/or metal loss due to corrosion.

Keeping with FIG. 1, another type of logging includes photoelectric effect (PEF) logging. In particular, a photoelectric effect describes a gamma-ray interaction in which a bound electron absorbs a gamma-ray. If the absorbed energy exceeds binding energy to an atom, the bound electron may be ejected from the atom, and an X-ray may be emitted. For example, materials with higher atomic numbers have an increased probability that the photoelectric effect will occur with low gamma-ray energy. Thus, a PEF log may measure photoelectric absorption properties that can be used to identify different types of lithology. More specifically, a PEF log may describe a photoelectric index (Pe) measurement based on the absorption of low-energy gamma rays by a formation (e.g., in units of barns per electron). The PEF log value may be a function of an aggregate atomic number (Z) of the elements in the formation and thus provide an indicator of mineralogy.

Turning to sonic logging or acoustic logging, the logging system (112) may measure the speed that acoustic waves travel through rocks in the formation (106) to determine porosity in the formation (106). This type of logging may generate borehole compensated (BHC) logs, which are also called sonic logs. In general, sound waves may travel faster through high-density shales than through lower-density sandstones.

Other types of logging include density logging and neutron logging. Density logging may determine porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. Other types of logging are also contemplated, such as resistivity logging and dielectric logging.

Turning to coring, reservoir characteristics may be determined using core sample data (e.g., core sample data (150)) acquired from a well site. For example, specific reservoir characteristics can be determined via coring (e.g., physical extraction of rock specimens) to produce core specimens and/or logging operations (e.g., wireline logging, logging-while-drilling (LWD), and measurement-while-drilling (MWD)). Coring operations may include physically extracting a rock specimen from a region of interest within the wellbore (104) for detailed laboratory analysis. For example, when drilling an oil or gas well, a coring bit may cut core plugs (or "cores" or "core specimens") from the formation (106) and bring the core plugs to the surface. These core specimens may be analyzed at the surface (e.g., in a lab) to determine various formation characteristics (106) at the location where the specimen was obtained.

Turning to various coring technique examples, conventional coring may include collecting a cylindrical specimen of rock from the wellbore (104) using a core bit, a core barrel, and a core catcher. The core bit may have a hole in its center that allows the core bit to drill around a central cylinder of rock. Subsequently, the resulting core specimen may be acquired by the core bit and disposed of inside the core barrel. More specifically, the core barrel may include a special storage chamber within a coring tool for holding the core specimen. Furthermore, the core catcher may provide a grip to the bottom of a core, and, as tension is applied to the drill string, the rock under the core breaks away from the undrilled formation below coring tool. Thus, the core catcher may retain the core specimen to avoid the core specimen falling through the bottom of the drill string.

Keeping with FIG. 1, geosteering may be used to position the drill bit or drill string of the drilling system (110) relative to a boundary between different subsurface layers (e.g., overlying, underlying, and lateral layers of a pay zone) during drilling operations. In particular, a formation property volume (e.g., formation property volume (175)) may be used by the drilling system (110) for steering the drill bit in the direction of desired hydrocarbon concentrations. In some embodiments, a well path of a wellbore (104) may be updated by the control system (114) using the formation property volume. For example, a control system (114) may communicate geosteering commands to the drilling system (110) based on well log data updates that are further adjusted by the reservoir simulator (160) using a formation property volume. As such, the control system (114) may generate one or more control signals for drilling equipment (or a logging system may generate for logging equipment) based on an updated well path design and/or an updated formation property volume. As such, a geosteering system may use various sensors located inside or adjacent to the drill string to determine different rock formations within a well path. In some geosteering systems, drilling tools may use resistivity or acoustic measurements to guide the drill bit during horizontal or lateral drilling.

Returning to a reservoir simulator (160), a reservoir simulator (160) may include hardware and/or software with functionality for generating one or more machine-learning models (170) for use in analyzing the formation (106). For example, the reservoir simulator (160) may store well logs (140) and data regarding core samples (150), and further analyze the well log data, the core sample data, seismic data, and/or other types of data to generate and/or update one or more machine-learning models (170) and/or one or more formation property volumes (175). Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the reservoir simulator (160) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of particular data input, thereby assigning significance to various data inputs for a task being modeled. A neural network may determine which data inputs should receive greater priority in determining one or more specified outputs of the neural network through machine learning. Likewise, these weighted data inputs may be summed such that this sum is communicated through a neuron's activation function to other hidden layers within the neural network. The activation function may determine whether and to what extent an output of a neuron progresses to other neurons where the output may be weighted again for use as an input to the next hidden layer.

In some embodiments, for example, a machine-learning algorithm is a grouping algorithm. A grouping algorithm may describe an unsupervised algorithm with a vector quantization method that uses data analysis, such as cluster analysis, to identify groups and label data points (e.g., wells or well log data portions) within the group. A group may correspond to a collection of data points aggregated together due to similarities among the data points. One example of a grouping algorithm is the k-means clustering algorithm. A target number k is determined, wherein k refers to many centroids in datasets and means refers to averaging the datasets. By reducing the in-cluster sum of squares, a k-means algorithm may identify a k number of centroids and then allocates data points to a particular cluster. For example, a vulnerability manager may use the k-means algorithm to data-mine by starting with an initial group of randomly selected centroids for every cluster. After determining an initial group, the vulnerability manager may iteratively optimize the positions of the centroids. Other types of grouping algorithms include hierarchical grouping, connectivity-based clustering, distribution-based grouping, density-based clustering, fuzzy clustering, and supervised grouping algorithms (e.g., using various constraints).

While FIG. 1 shows various configurations of components, other configurations may be used without departing from the scope of the disclosure. For example, multiple components in FIG. 1 may be combined to create a single component. As another example, the functionality performed by a single component may be performed by two or more components.

Figure 2:
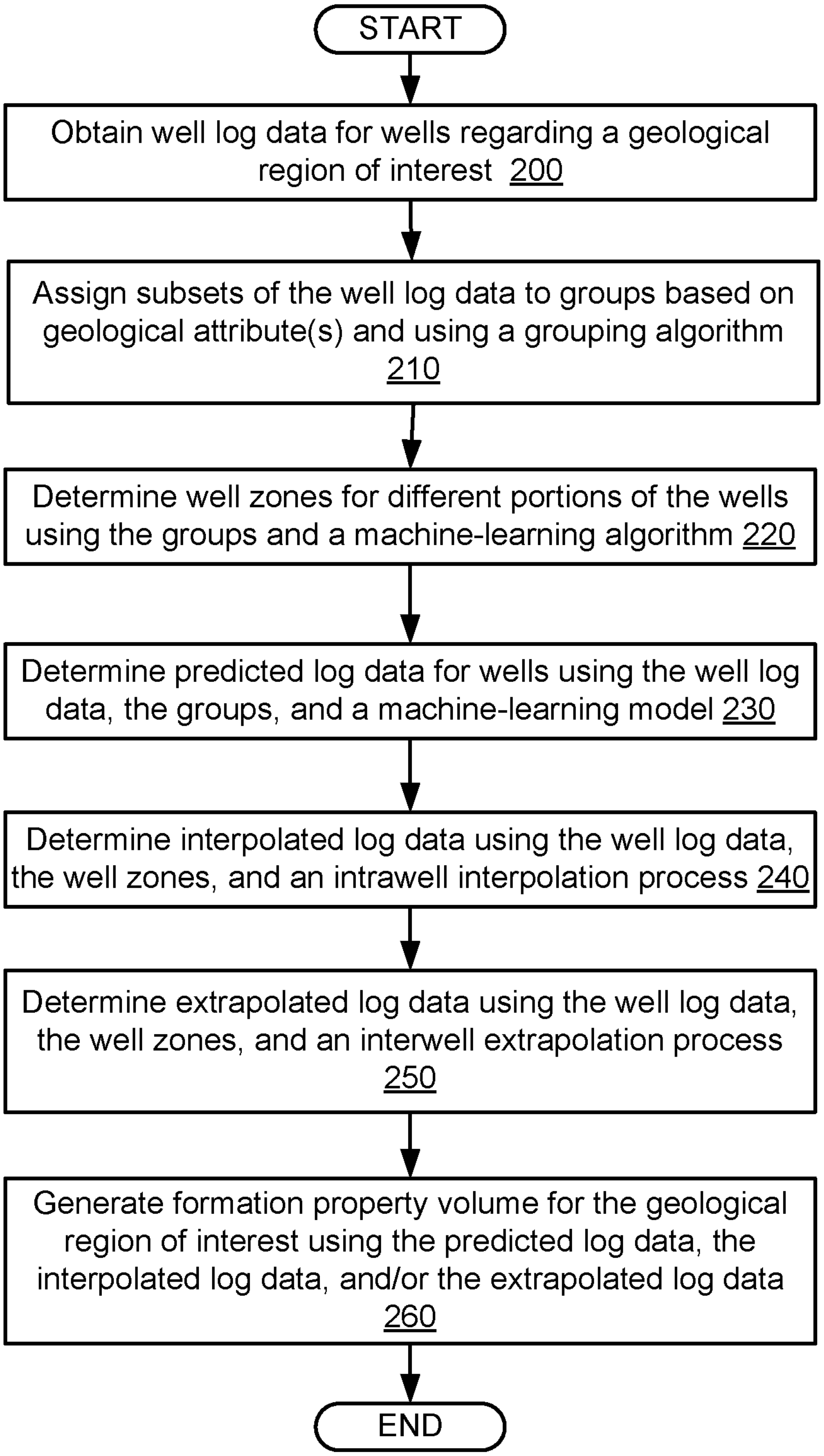
FIG. 2 shows a flowchart following one or more embodiments.

Turning to FIG. 2, FIG. 2 shows a flowchart in accordance with one or more embodiments. Specifically, FIG. 2 describes a general method for generating and/or using a formation property volume. One or more blocks in FIG. 2 may be performed by one or more components (e.g., reservoir simulator (160)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, well log data are obtained for various wells regarding a geological region of interest in accordance with one or more embodiments. In particular, the well log data may be acquired using one or more logging tools similar to various logging tools described above in FIG. 1 and the accompanying description. Examples of well log data may include neutron log data, density log data, gamma-ray (GR) log data, caliper log data, deep resistivity log data, shallow resistivity log data, spontaneous potential (SP) log data, and/or photoelectric effect (PEF) log data. Thus, different types of well log data may be used to classify various geological attributes, such as different lithofacies types, stratigraphy horizons, and geological time periods. A geological region of interest may be a portion of a geological area or volume that includes one or more formations of interest desired or selected for analysis, e.g., for determining the location of hydrocarbons or for reservoir development purposes. In particular, the geological region of interest may include multiple wells already drilled and locations of one or more wells planned for drilling.

Furthermore, well log data may provide high-resolution measurements for exploration, development, reservoir characterization, and well management. Thus, logging tools may be employed in various fields, yielding large quantities of a large diverse and multimodal logging dataset. This aggregated well log data may be nonuniformly sampled within the geological region of interest due to irregular well spacing, different logging depth ranges, and limited availability of certain well log types of data at various well locations. While some wells may have a comprehensive set of well log data, many wells may have only basic well log types. Thus, the well log data may only cover limited depth ranges or certain depth segments of well log data may be missing. In other cases, particular types of well log measurements may have been acquired at very poor quality.

In Block 210, various subsets of well log data are assigned to various groups based on one or more geological attributes and using a grouping algorithm in accordance with one or more embodiments. In some embodiments, the grouping algorithm is an unsupervised machine-learning algorithm, such as k-means clustering, a weakly supervised machine-learning algorithm, or a supervised learning method, such as an eXtreme Gradient Boosting (XGBoost) algorithm. Likewise, the grouping algorithm may be implemented within an algorithmic model, such as a convolutional neural network (CNN) or a long short-term memory (LSTM). As such, well log data from different wells may be grouped based on one or more geological attributes, such as facies types, stratigraphy horizon correlations, and geological time periods of a respective formation.

Figure 3:
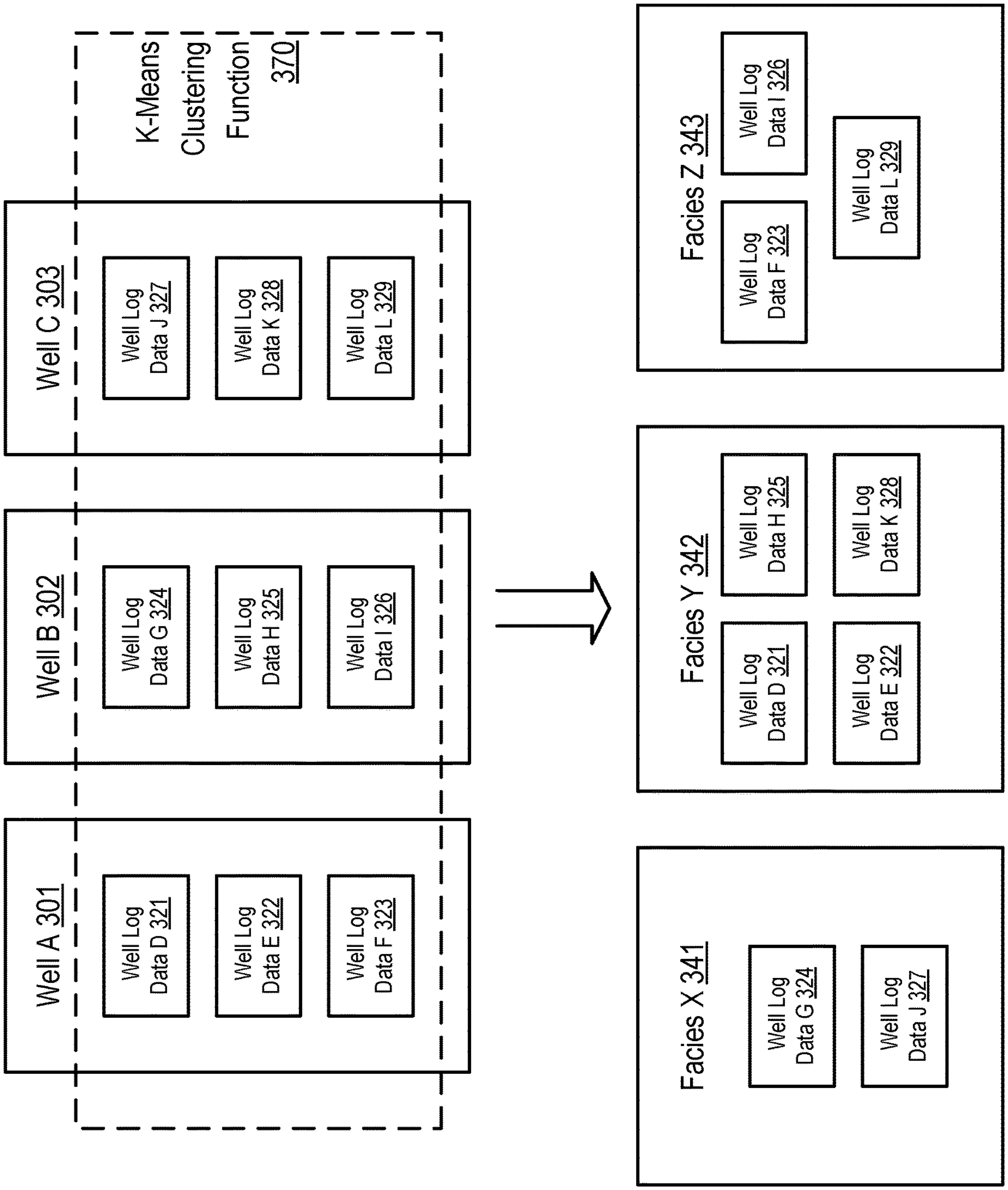
FIGS. 3, 4, 5, 6, 7A, 7B, 7C, and 8 show examples under one or more embodiments.

Turning to FIG. 3, FIG. 3 provides an example of grouping well log data using a geological attribute in accordance with one or more embodiments. The following example is for explanatory purposes only and not intended to limit the scope of the disclosed technology. In FIG. 3, a reservoir simulator (not shown) obtains well log data (i.e., well log data D (321), well log data E (322), well log data F (323), well log data G (324), well log data H (325), well log data I (326), well log data J (327), well log data K (328), and well log data L (329)) from three wells, i.e., well A (301), well B (302), and well C (303). Using a k-means clustering function (370), the reservoir simulator assigns the well log data (321, 322, 323, 324, 325, 326, 327, 328, 329) to different groups based on different facies as the geological attribute. In particular, well log data G (324) and well log data J (327) are assigned to a group for facies X (341). Well log data D (321), well log data H (325), well log data E (322), and well log data K (328) are assigned to another group for facies Y (342). Finally, well log data F (323), well log data I (326), and well log data L (329) are assigned to a group for facies Z (343).

Returning to FIG. 2, in Block 220, various well zones are determined for different portions of various wells using various groups and a machine-learning algorithm in accordance with one or more embodiments. More specifically, well log data may be populated back to their original well, while respective logged depth ranges may be segmented into different well zones based on the grouping results. For exampling, a well zone may corresponding to different depth values (such as true vertical depth (TVD) values) that define one or more geological attributes associated with other groups.

A well zone is determined using a machine-learning algorithm in some embodiments, such as vertical smoothing (i.e., smoothing along a vertical direction) and/or horizontal smoothing (i.e., smoothing along a horizontal direction). For example, smoothing may be performed using one or more smoothing functions that determine a local domain or global domain for one or more geological attributes for a particular well zone. The smoothing functions may thus generate smoothed well log data for a respective well zone. An estimation of the underlying well log data associated with a geological attribute may be called a smooth. Examples of smoothing techniques may include regular bin smoothing or bin smoothing with a simple moving average (e.g., a variable bin-width with a fixed number of observations). Likewise, smoothing techniques may include a running line smoother, a kernel density smoother, and/or a locally estimated scatterplot smoother. Smoothing techniques may be based on well position information, such as northing and easting coordinates.

In some embodiments, one or more well zones are determined using a majority voting algorithm. For example, a majority voting algorithm may be a machine-learning algorithm that includes a voting ensemble (also called a "majority voting ensemble") that may be an ensemble machine-learning model that combines the predictions from multiple other machine-learning models. Thus, a majority voting algorithm may determine well zones based on geological attributes with more accuracy than when using a single machine-learning model.

Figure 4:
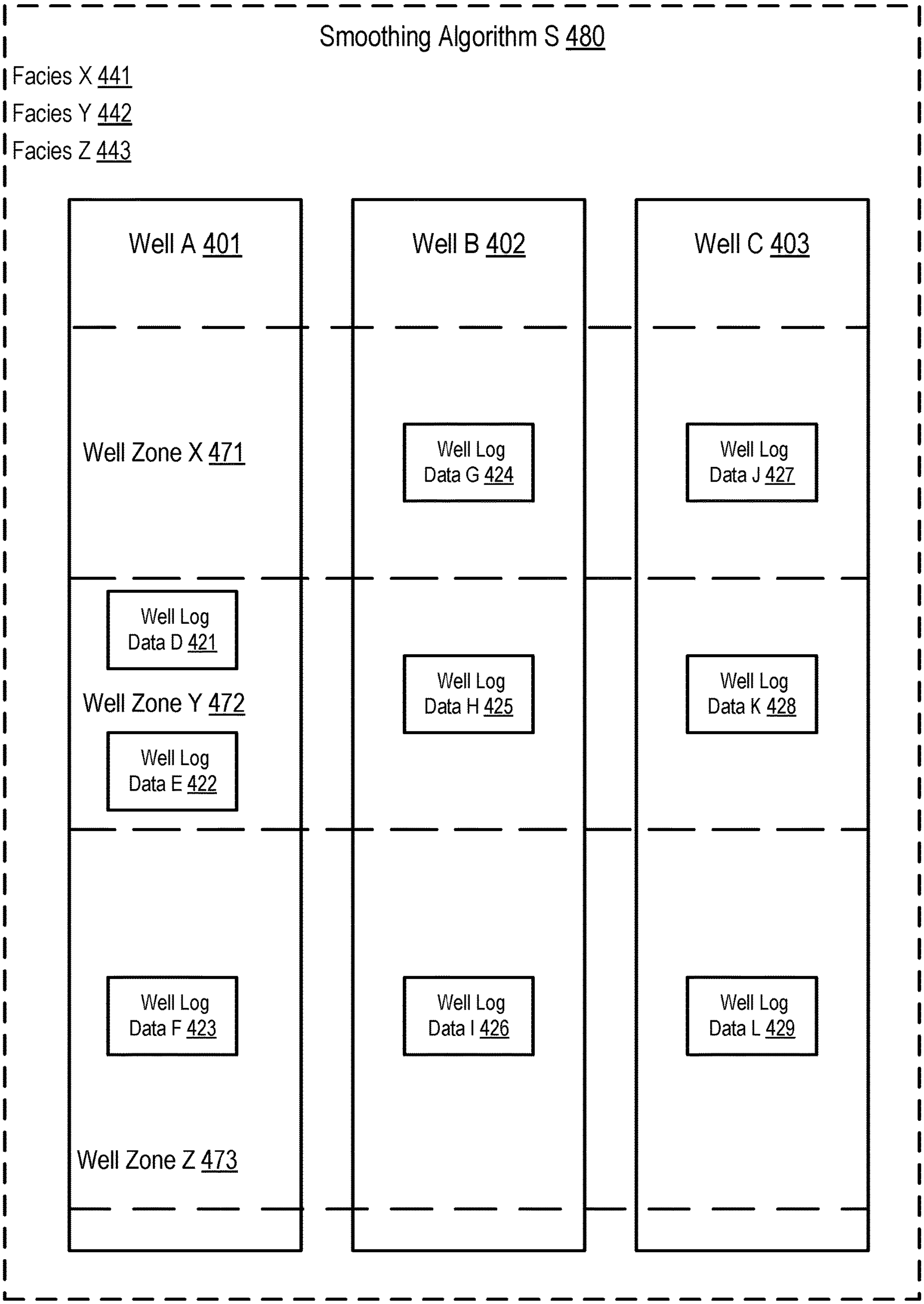

Turning to FIG. 4, FIG. 4 provides an example of determining well zones using a smoothing algorithm in accordance with one or more embodiments. The following example is for explanatory purposes only and not intended to limit the scope of the disclosed technology. In FIG. 4, a reservoir simulator (not shown) applies a smoothing algorithm S (480) to various groups, i.e., facies X (441), facies Y (442), and facies Z (443), with their corresponding well log data (i.e., well log data D (421), well log data E (422), well log data F (423), well log data G (424), well log data H (425), well log data I (426), well log data J (427), well log data K (428), and well log data L (429)) from three wells, i.e., well A (401), well B (402), and well C (403). Based on the output of the smoothing algorithm X (480), the reservoir simulator determines various well zones, i.e., well zone X (471), well zone Y (472), and well zone Z (473). Thus, the well zones (471, 472, 472) may describe various depth dimensions of the different facies geological attributes.

Returning to FIG. 2, in Block 230, predicted log data are determined for wells using well log data, various groups, and a machine-learning model in accordance with one or more embodiments. In some embodiments, for example, a machine-learning model may use input well log data to predict a different type of well log data for a well. In particular, well logs may be available for a well acquired using various basic logging tools, while well logs may be lacking for more specialized logging equipment. Likewise, well properties and spatial information are used as inputs to a machine-learning model in order to make spatial predictions, e.g., using spatial information and well log data in a random forest machine-learning algorithm.

Furthermore, cross-modal prediction may be performed for a well of interest or adjacent wells. In a cross-modal prediction techniques, existing well log data in individual wells may be predicted for missing well log data using one or more deep learning techniques based on grouping results from one or more geological attributes. Moreover, a machine-learning model may be initially trained on well log samples from similar grouped well zones and then the trained model may be applied to wells with missing logs for prediction.

Figure 5:
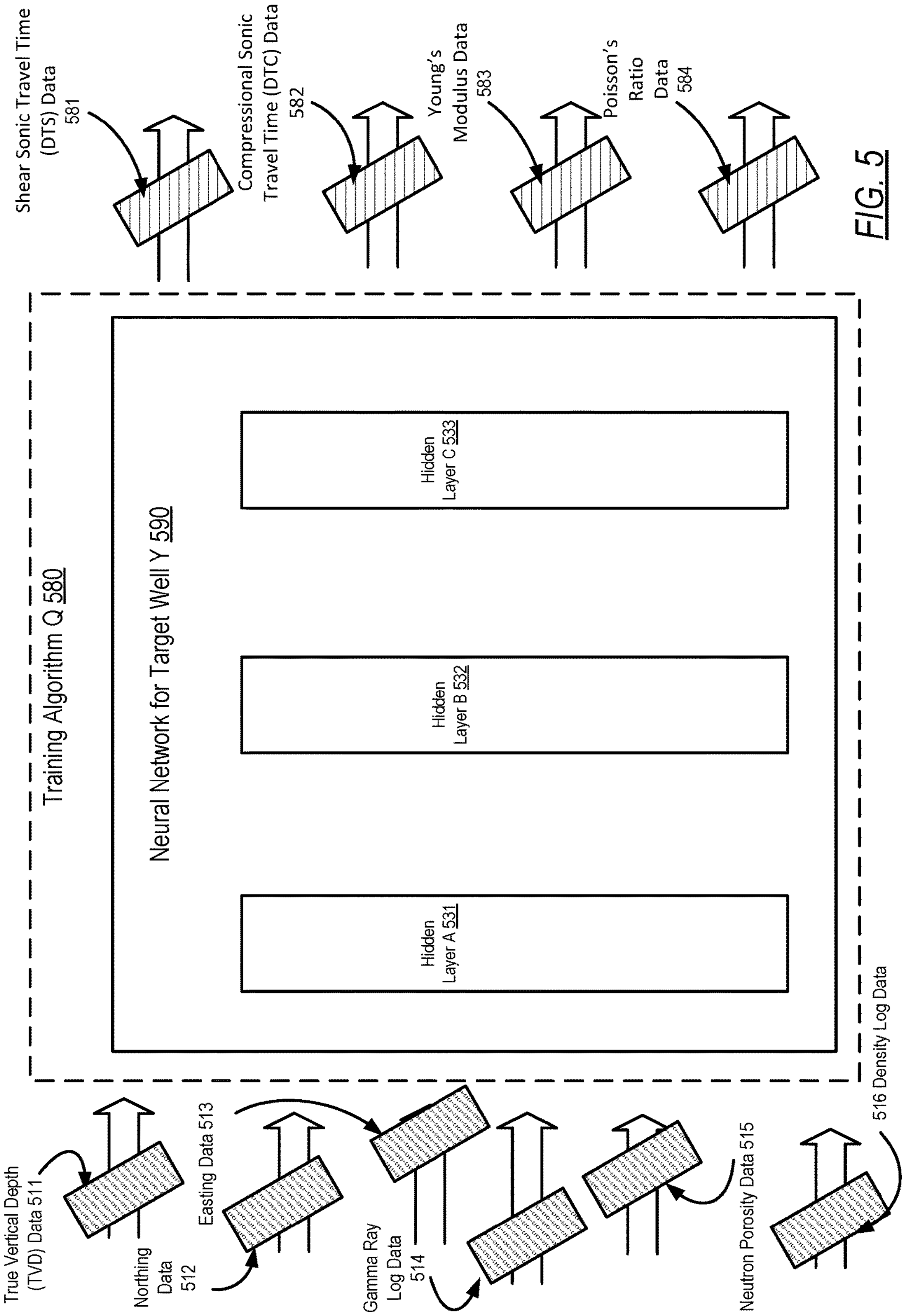
Figure 6:
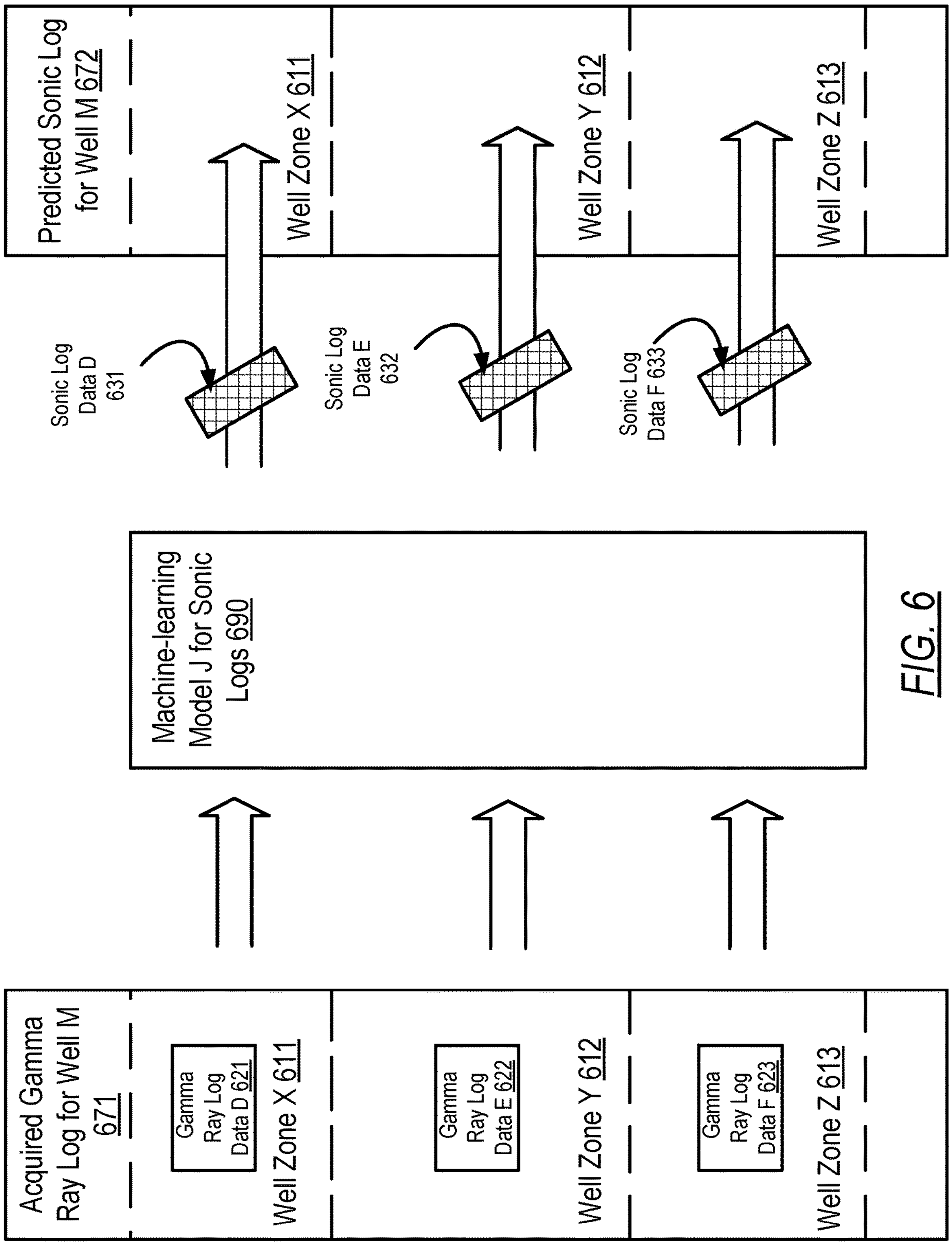

Turning to FIGS. 5 and 6, FIGS. 5 and 6 provide examples of determining predicted log data using a machine-learning model in accordance with one or more embodiments. The following examples are for explanatory purposes only and not intended to limit the scope of the disclosed technology. In FIG. 5, a neural network (590) for a target well Y is trained using a machine-learning algorithm, i.e., training algorithm Q (580). In particular, the neural network (590) includes three hidden layers, i.e., hidden layer A (531), hidden layer B (532), and hidden layer C (533). It obtains the following inputs, i.e., true vertical depth (TVD) data (511), northing data (512), easting data (513), gamma-ray log data (514), neutron porosity data (515), and density log data (516). Based on the input data, the neural network (590) determines the following predicted log data for target well Y, i.e., shear sonic travel time (DTS) data (581), compressional sonic travel time (DTC) data (582), Young's Modulus data (583), and Poisson's ratio data (584).

Turning to FIG. 6, FIG. 6 shows a machine-learning model J (690) for determining sonic log data from gamma-ray log data. As shown, an acquired gamma-ray log (671) for well M includes gamma-ray log data D (621) in well zone X (611), gamma-ray log data E (622) in well zone Y (612), and gamma-ray log data F (623) in well zone Z (613). Based on using the gamma-ray log data as input data, the machine-learning model J (690) determines the following predicted sonic log (672) for well M that includes sonic log data D (631) for well zone X (611), sonic log data E (632) for well zone Y (612), and sonic log data F (633) for well zone Z (613).

Returning to FIG. 2, in Block 240, interpolated log data are determined using well log data, various well zones, and an intrawell interpolation process in accordance with one or more embodiments. For example, in some embodiments, well zones may be used to determine depth interpolation and extrapolation of well log data. In particular, input data for a machine-learning model may be obtained from vertical neighboring depth ranges as well as data from similar well zones in adjacent wells within an intrawell interpolation process. As such, a reservoir simulator may determine predicted log data for one or more missing depth ranges. Thus, some embodiments may be implemented using low-rank constrained approximation or multivariate sequence learning techniques such as convolutional LSTM.

In Block 250, extrapolated log data are determined using well log data, various well zones, and an interwell extrapolation process in accordance with one or more embodiments. For example, an interwell extrapolation process may determine log data at a predetermined location outside a logging depth range from adjacent well data Thus, an interwell extrapolation process may provide pseudo well log data at locations in-between actual logged wells for interwell regions.

In some embodiments, an interwell extrapolation process is based on seismic data. For example, seismic data may provide geological information regarding one or more interwell regions that are outside a logging tool's range. Thus, seismic data may provide an additional input to a machine-learning model or a machine-learning algorithm. However, in the absence of seismic data, the interwell extrapolation process may be based on well log data alone, such as spatial zoning and smoothing operations.

In Block 260, well log data, predicted log data, interpolated well log data, and/or extrapolated well log data are validated in accordance with one or more embodiments. In some embodiments, low-quality well log data is detected for various wells based on deviations from predicted log data. Once detected, the well log data may be corrected accordingly. Likewise, interpolated data and/or extrapolated data from an intrawell interpolation process and/or interwell extrapolation process, respectively, may be validated using predicted log data from one or more machine-learning models. For example, if the interpolated data or extrapolated data is within a predetermined degree of accuracy of the predicted log data, such data is validated for usage in one or more applications or inclusion in a formation property volume.

Figure 7A:
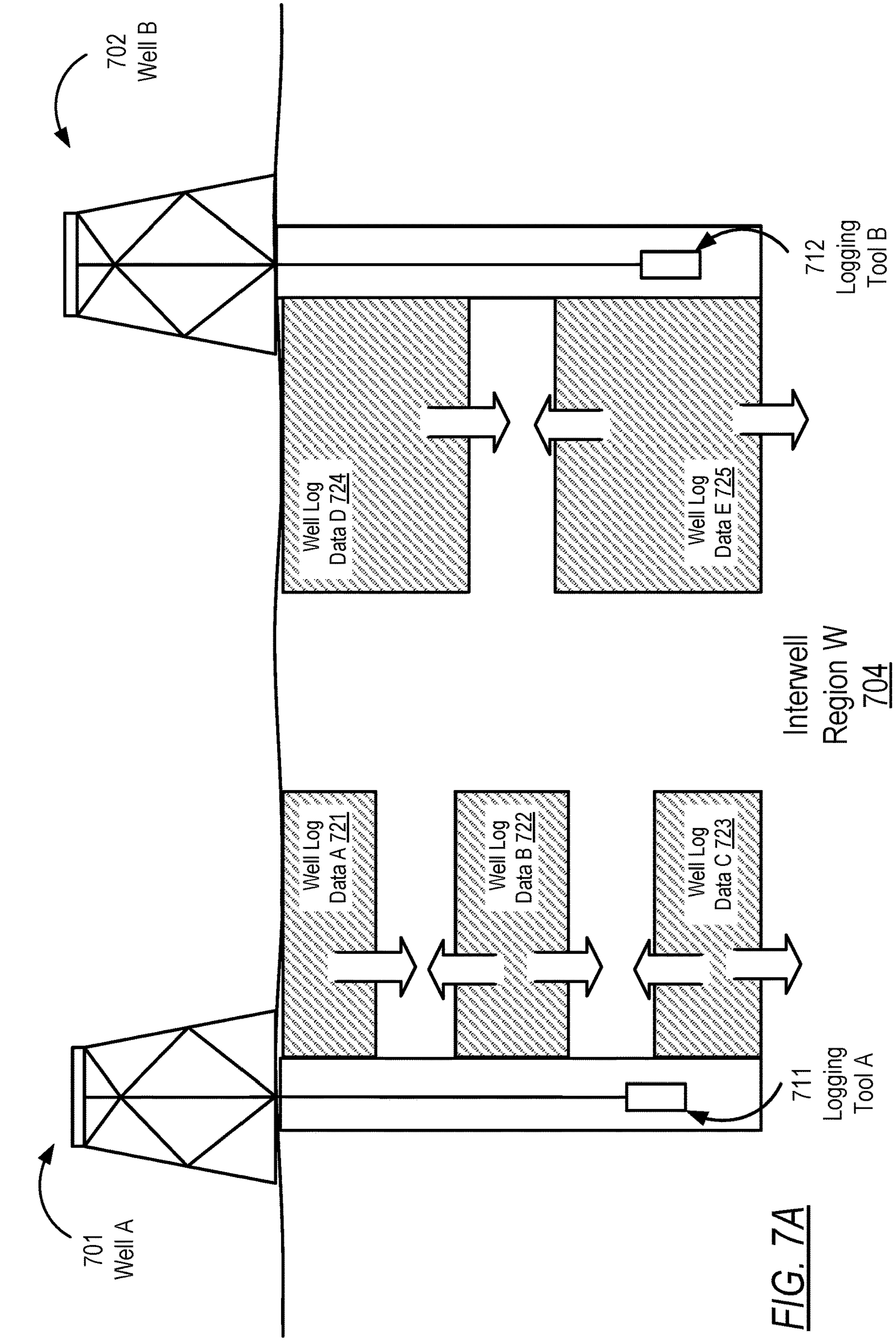
Figure 7B:
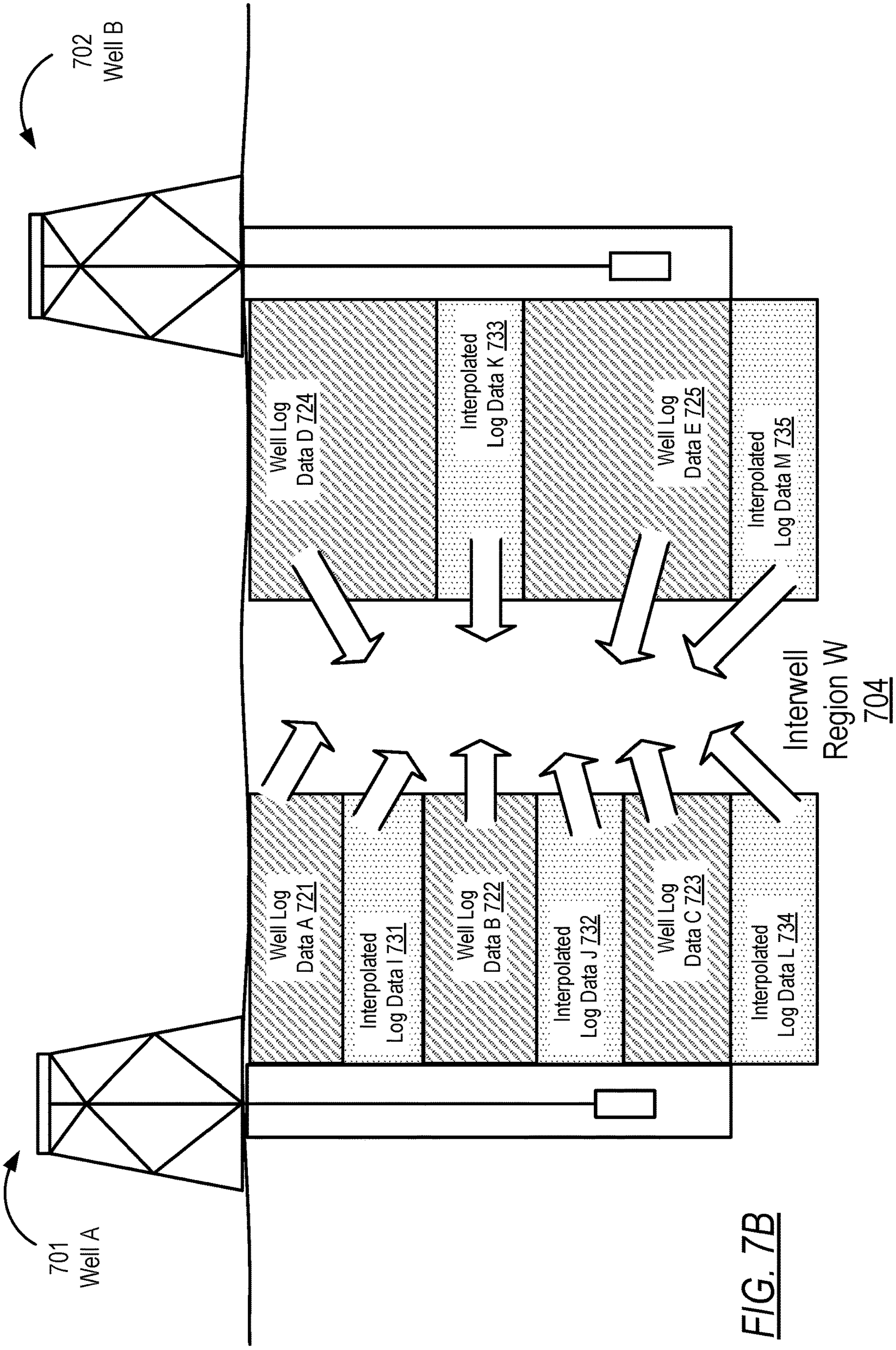
Figure 7C:
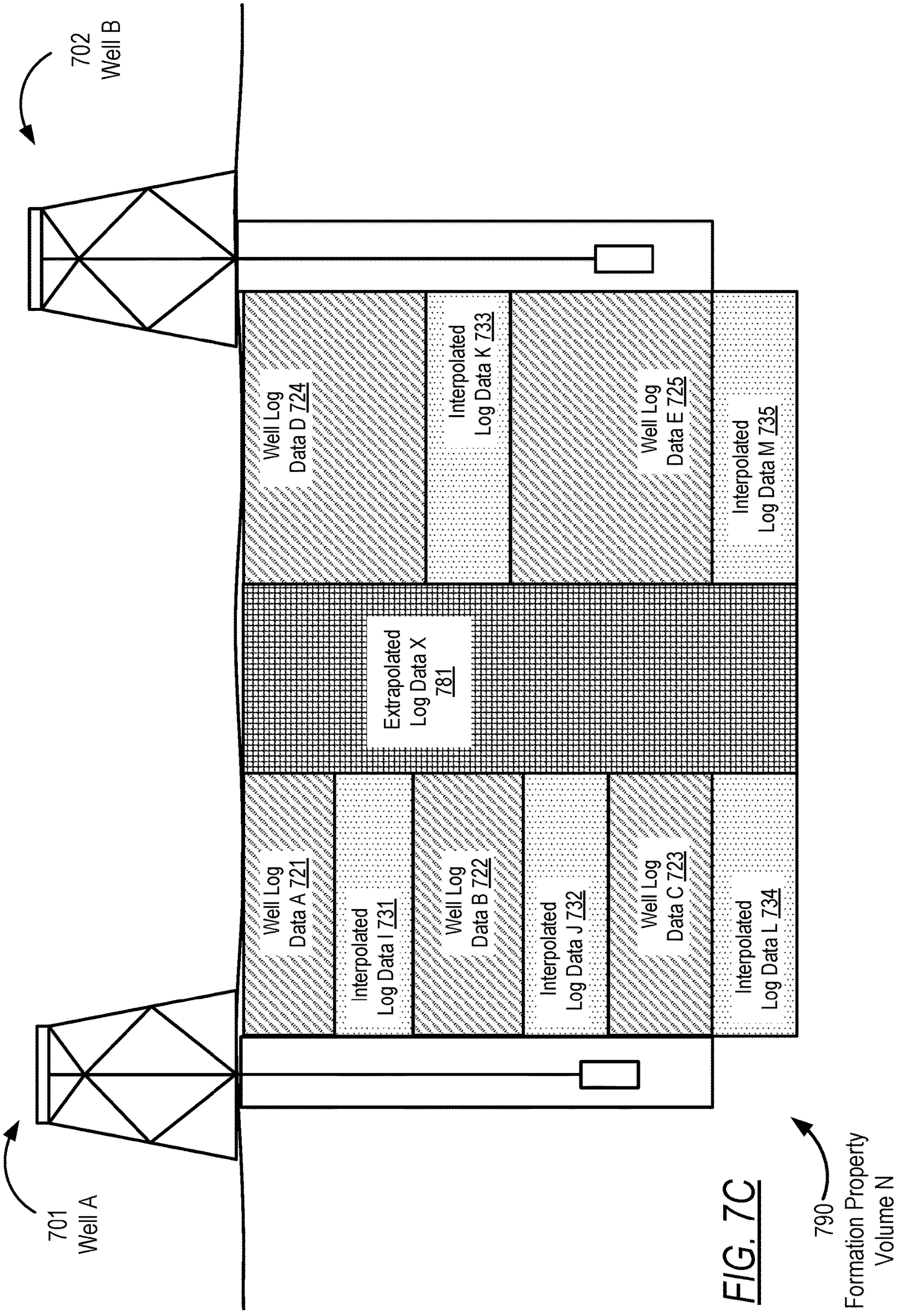

Turning to FIGS. 7A, 7B, and 7C, FIGS. 7A, 7B, and 7C provide an example of generating a formation property volume in accordance with one or more embodiments. The following example is for explanatory purposes only and not intended to limit the scope of the disclosed technology. In FIG. 7A, well log data is acquired for two wells, i.e., well A (701) and well B (702), with an interwell region W (704) located between both wells (701, 702). In particular, the well log data is acquired using logging tool A (711) and logging tool B (712), respectively, and includes well log A (721), well log B (722), well log C (723), well log D (724), and well log E (725). As shown in FIG. 7A, a reservoir simulator (not shown) uses an intrawell interpolation process for the well log data (721, 722, 723), and another intrawell interpolation process for the well log data (724, 725) to determine interpolated log data outside of the acquired log data. As shown in FIG. 7B, for well A (701), the intrawell interpolation process has determined interpolated log data I (731) between well log data A (721) and well log data B (722), interpolated log data J (732) between well log data B (722) and well log data C (723), and interpolated log data L (734) beyond the drilled wellbore. For well B (702), the intrawell interpolation process has determined interpolated log data K (733) between well log data D (724) and well log data E (725) and interpolated log data M (735) beyond the drilled wellbore.

Keeping with FIG. 7B, an interwell extrapolation process is used to determine missing log data for the interwell region W (704). Using the well log data (721, 722, 723, 724, 725) and the interpolated log data (731, 732, 733, 734, 735), a reservoir simulator uses the interwell extrapolation process to determine extrapolated log data X (781). Thus, as shown in FIG. 7C, a formation property volume N (790) is based on the well log data (721, 722, 723, 724, 725), the interpolated log data (731, 732, 733, 734, 735), and the extrapolated log data (781).

Returning to FIG. 2, in Block 270, a formation property volume is generated for a geological region of interest using predicted log data, interpolated log data, and/or extrapolated log data in accordance with one or more embodiments. In some embodiments, the formation property volume provides a 3D spatial interpolation and extrapolation of formation properties from acquired well log data, interpolated log data, and extrapolated log data. As such, the formation property volume may be based on groups determined with a grouping algorithm, well zones from a machine-learning algorithm, and in-zone predicted log data. Thus, the formation property volume may provide a 2D or 3D model based on a complete set of log measurements. Therefore, the formation property volume may be used for geosteering, determining possible locations for hydrocarbon exploration, and/or reservoir modeling.

Figure 8:
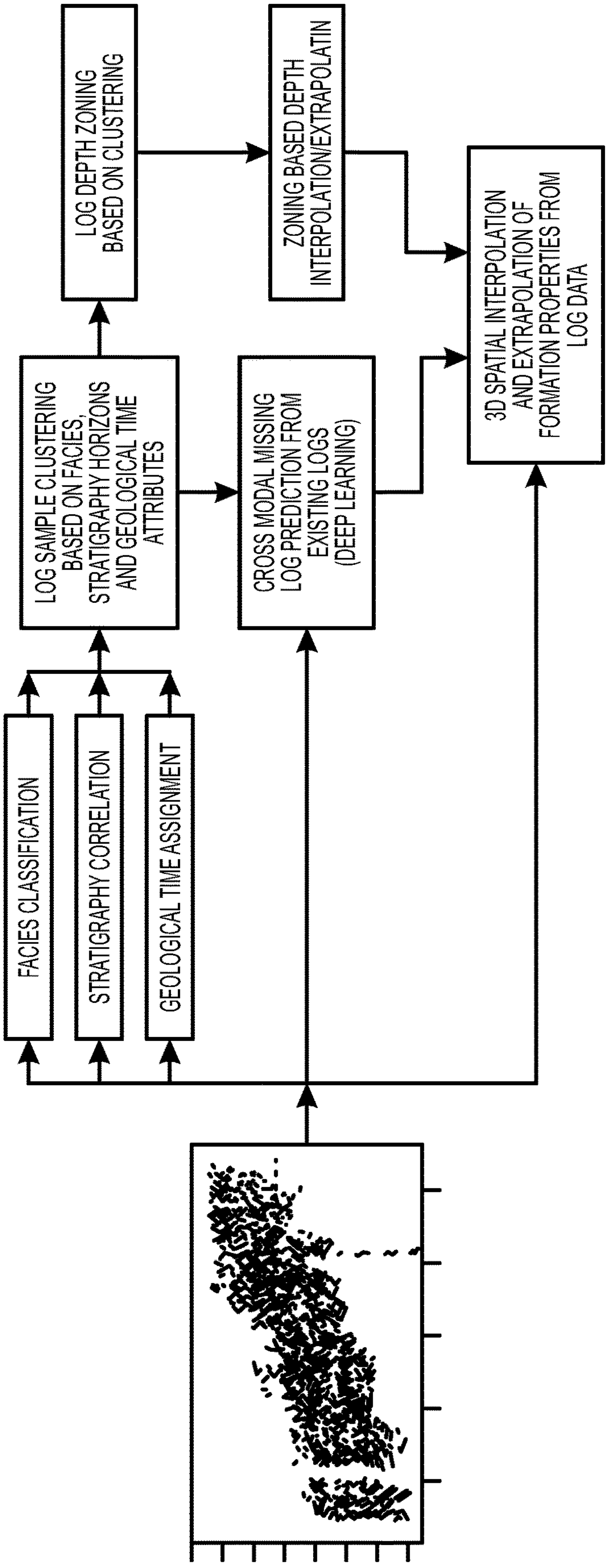

Turning to FIG. 8, FIG. 8 shows a software workflow for processing various well logs in accordance with one or more embodiments. For example, FIG. 8 provides one example of one embodiment based on the processes described in FIG. 2 and the accompanying description. Here, well log data can be chosen interactively along a certain lines among various selected wells.

Figure 9:
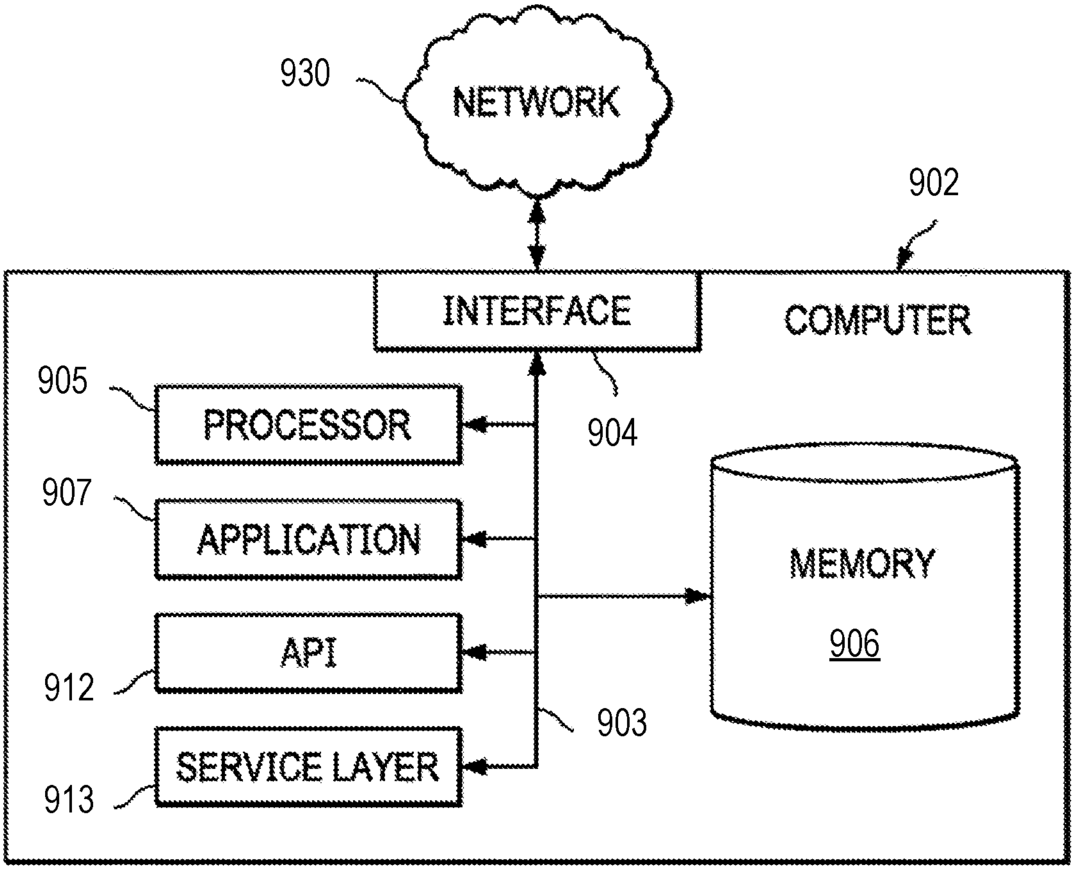
FIG. 9 shows a computer system in accordance with one or more embodiments.

Embodiments may be implemented on a computer system. FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a high-performance computing (HPC) device, a server, desktop computer, laptop/notebook computer, wireless data port, smartphone, personal data assistant (PDA), tablet computing device, one or more processors within these devices, or any other suitable processing device, including both physical or virtual instances (or both) of the computing device. Additionally, the computer (902) may include a computer that consists of an input device, such as a keypad, keyboard, touch screen, or other device that can accept user information and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or another server (or a combination of servers).

The computer (902) can receive requests over a network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other relevant entities, individuals, systems, or computers.

Each of the computer components can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another proper format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that is connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular computer implementations (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to the functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing a computer (902), each computer (902) communicating over a network (930). Further, the term "client," "user," and other appropriate terminology may be used interchangeably as appropriate without departing from the scope of this disclosure. Moreover, this disclosure contemplates that many users may use one computer (902) or that one user may use multiple computers (902).

In some embodiments, the computer (902) is implemented as part of a cloud computing system. For example, a cloud computing system may include one or more remote servers and various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:

acquiring, using a gamma ray logging tool, a first plurality of gamma ray logs for a first plurality of wells in a geological region of interest, wherein the gamma ray logging tool is used to measure naturally occurring gamma radiation in a first rock region within a wellbore;

acquiring, using a density logging tool, a first plurality of density logs for the first plurality of wells;

acquiring, using a sonic logging tool, a first plurality of sonic logs for the first plurality of wells, wherein the sonic logging tool is used to measure a speed that one or more acoustic waves travel through a second rock region of the wellbore;

training a first machine-learning model using the first plurality of sonic logs, the first plurality of gamma ray logs, the first plurality of density logs, and a machine-learning algorithm to produce a trained model, wherein the trained model is a deep neural network with a plurality of hidden layers, an input layer, and an output layer, wherein the machine-learning algorithm is a supervised learning method or an unsupervised learning method, and wherein the machine-learning algorithm trains the trained model on a plurality of well log samples from the first plurality of gamma ray logs, the first plurality of density logs, and the first plurality of sonic logs prior to the trained model being used for predicting one or more missing well logs;

obtaining, by a computer processor, well log data for a second plurality of wells, wherein the well log data comprises a second plurality of gamma ray logs and a second plurality of density logs;

assigning, by the computer processor and using a grouping algorithm, a plurality of subsets of the well log data to a plurality of groups based on one or more geological attributes, wherein the grouping algorithm is a k-means clustering algorithm, wherein the plurality of groups comprise a first group of the well log data based on a first subset among the plurality of subsets and a second group of the well log data based on a second subset among the plurality of subsets, and wherein the first group of the well log data corresponds to data at a different depth than the second group of the well log data;

determining, by the computer processor and using the plurality of groups, a plurality of well zones for different portions of a respective well among the second plurality of wells;

determining, by the computer processor, a plurality of predicted sonic logs for the second plurality of wells using the trained model and the well log data, wherein the trained model uses a portion of the second plurality of gamma ray logs and a portion of the second plurality of density logs as inputs to the input layer of the trained model, wherein the trained model obtains gamma-ray (GR) log data, true vertical depth (TVD) data, northing data, and easting data as inputs to the input layer, and wherein the trained model provides sonic log data, Poisson's ratio data, and Young's modulus data from the output layer of the trained model;

determining, by the computer processor, interpolated log data using the well log data, the plurality of predicted sonic logs, the Poisson's ratio data, the Young's modulus data, the plurality of well zones, and an intrawell interpolation process;

generating, by the computer processor, a formation property volume based on the interpolated log data and the well log data; and determining, by the computer processor, a location of hydrocarbons in the geological region of interest using the formation property volume.

2. The method of claim 1, further comprising:

determining predicted log data for a predetermined well among the second plurality of wells using a second machine-learning model, wherein the predicted log data corresponds to a predetermined well log type that is missing for the predetermined well among in the well log data, and wherein the formation property volume is based on the predicted log data.

3. The method of claim 1, further comprising:

determining extrapolated log data using the well log data, the plurality of well zones, and an interwell extrapolation process, wherein the extrapolated log data corresponds to one or more interwell regions between a first well and a second well among the second plurality of wells, and wherein the formation property volume is based on the extrapolated log data.

4. The method of claim 3, further comprising:

obtaining seismic data regarding the geological region of interest, wherein the interwell extrapolation process uses the seismic data to determine the extrapolated log data.

5. The method of claim 1, wherein the one or more geological attributes are selected from a group consisting of a facies classification, a stratigraphy horizon, and a geological time period.

6. The method of claim 1, wherein at least one well zone among the plurality of well zones corresponds to a predetermined depth range within a respective well among the second plurality of wells, and wherein the at least one well zone comprises smoothed well log data that is generated using a vertical smoothing and a horizontal smoothing.

7. The method of claim 1, wherein the formation property volume corresponds to a three-dimensional region that describes a plurality of geological properties, and wherein the plurality of geological properties are selected from a group consisting of porosity, permittivity, resistivity, density, and water saturation.

8. A system, comprising:

a logging system coupled to a gamma ray logging tool, a sonic logging tool, and a density logging tool, wherein the gamma ray logging tool is configured to acquire a first plurality of gamma ray logs for a first plurality of wells in a geological region of interest, wherein the gamma ray logging tool is used to measure naturally occurring gamma radiation in a first rock region within a wellbore, wherein the density logging tool is configured to acquire a first plurality of density logs for the first plurality of wells, and wherein the sonic logging tool is configured to acquire a first plurality of sonic logs for the first plurality of wells, wherein the sonic logging tool is used to measure a speed that one or more acoustic waves travel through a second rock region of the wellbore;

a well system coupled to the logging system and a wellbore; and a reservoir simulator comprising a computer processor, wherein the reservoir simulator is coupled to the logging system and the well system, the reservoir simulator is configured to perform a method comprising:

training a first machine-learning model using the first plurality of sonic logs, the first plurality of gamma ray logs, the first plurality of density logs, and a machine-learning algorithm to produce a trained model, wherein the trained model is a deep neural network with a plurality of hidden layers, an input layer, and an output layer, wherein the machine-learning algorithm is a supervised learning method or an unsupervised learning method, and wherein the machine-learning algorithm trains the trained model on a plurality of well log samples from the first plurality of gamma ray logs, the first plurality of density logs, and the first plurality of sonic logs prior to the trained model being used for predicting one or more missing well logs;

obtaining well log data for a second plurality of wells, wherein the well log data comprises a second plurality of gamma ray logs and a second plurality of density logs;

assigning, using a grouping algorithm, a plurality of subsets of the well log data to a plurality of groups based on one or more geological attributes, wherein the grouping algorithm is a k-means clustering algorithm, wherein the plurality of groups comprise a first group of the well log data based on a first subset among the plurality of subsets and a second group of the well log data based on a second subset among the plurality of subsets, and wherein the first group of the well log data corresponds to data at a different depth than the second group of the well log data;

determining, using the plurality of groups, a plurality of well zones for different portions of a respective well among the second plurality of wells;

determining a plurality of predicted sonic logs for the second plurality of wells using the trained model and the well log data, wherein the trained model uses a portion of the second plurality of gamma ray logs and a portion of the second plurality of density logs as inputs to the input layer of the trained model, wherein the trained model obtains gamma-ray (GR) log data, true vertical depth (TVD) data, northing data, and easting data as inputs to the input layer, and wherein the trained model provides sonic log data, Poisson's ratio data, and Young's modulus data from the output layer of the trained model;

determining interpolated log data using the well log data, the plurality of predicted sonic logs, the Poisson's ratio data, the Young's modulus data, the plurality of well zones, and an intrawell interpolation process;

generating a formation property volume based on the interpolated log data and the well log data; and determining a location of hydrocarbons in the geological region of interest using the formation property volume.

9. The system of claim 8, wherein the method further comprises:

determining predicted log data for a predetermined well among the second plurality of wells using a second machine-learning model, wherein the predicted log data corresponds to a predetermined well log type that is missing for the predetermined well in the well log data, and wherein the formation property volume is based on the predicted log data.

10. The system of claim 8, wherein the method further comprises:

determining extrapolated log data using the well log data, the plurality of well zones, and an interwell extrapolation process, wherein the extrapolated log data corresponds to one or more interwell regions between a first well and a second well among the second plurality of wells, and wherein the formation property volume is based on the extrapolated log data.

11. The system of claim 10, wherein the method further comprises:

obtaining seismic data regarding the geological region of interest, wherein the interwell extrapolation process uses the seismic data to determine the extrapolated log data.

12. The system of claim 8, wherein at least one well zone among the plurality of well zones corresponds to a predetermined depth range within a respective well among the second plurality of wells, and wherein the at least one well zone comprises smoothed well log data that is generated using a vertical smoothing and a horizontal smoothing.

13. The system of claim 8, wherein the formation property volume corresponds to a three-dimensional region that describes a plurality of geological properties, and wherein the plurality of geological properties are selected from a group consisting of porosity, permittivity, resistivity, density, and water saturation.

* * * * *